(12) United States Patent  
Lagebrake et al.

(10) Patent No.: US 8,088,638 B1
(45) Date of Patent: Jan. 3, 2012

(54) MEMS DC TO DC SWITCHING CONVERTER

(75) Inventors: Lawrence Lagebrake, Seminole, FL (US); Shinzo Onishi, Seminole, FL (US); Scott Samson, Safety Harbor, FL (US); Raj Popuri, Tampa, FL (US)

(73) Assignee: University of South Florida, Tampa, FL (US)

( * ) Notice: Subject to any disclaimer, the term of this patent is extended or adjusted under 35 U.S.C. 154(b) by 1327 days.

(21) Appl. No.: 11/687,223

(22) Filed: Mar. 16, 2007

Related U.S. Application Data

(60) Provisional application No. 60/767,303, filed on Mar. 16, 2006.

(51) Int. Cl.
*H01L 21/00* (2006.01)

(52) U.S. Cl. .......................................... 438/50; 310/309
(58) Field of Classification Search ................... 438/50; 310/309
See application file for complete search history.

(56) References Cited

U.S. PATENT DOCUMENTS

2005/0173235 A1* 8/2005 Nielson et al. ............... 200/181
* cited by examiner

*Primary Examiner* — Long Pham
(74) *Attorney, Agent, or Firm* — Molly L. Sauter; Smith & Hopen, P.A.

(57) ABSTRACT

The present invention provides a DC high voltage converter having an oscillator driver, main switch array and topological enhanced capacitors. The switch array utilizes MEM cantilevers and topological capacitors for charge storages for the generation of a high voltage output from a low voltage input.

6 Claims, 7 Drawing Sheets

(a) PARALLEL SERIES CONVERTER (b) CHARGE TRANSFER CONVERTER (a) CHARGE TRANSFER CONVERTER (b) ONE SOURCE TRANSFER CONVERTER WITH AN ADDITION SW (a)

(b)

MEMS DC TO DC SWITCHING CONVERTER

CROSS REFERENCE TO RELATED APPLICATIONS

This application claims priority to currently pending U.S. Provisional Patent Application 60/767,303, entitled, "MEMS DC to DC Switching Converter," filed Mar. 16, 2006, the contents of which are herein incorporated by reference.

STATEMENT OF GOVERNMENT INTEREST

This invention was made with Government support under Grant Nos. DASG60-00-C-0089 awarded by the SMDC. The Government has certain rights in the invention.

BACKGROUND OF THE INVENTION

The present invention relates to the field of micro-mechanical switching converters using micro-mechanical transducers. Micro-mechanical switching circuits provide many applications such as voltage converters, switching regulators, phase matching, etc. Mechanical and electronic switching circuits are widely used and micro-mechanical switching circuits can additionally be complimented with traditional switching devices.

MEMS switching converters are known in the art. The many benefits of a MEMS implementation for switching converters include; no voltage loss due to p-n junction, low ohm losses, radiation resistance, ability to convert voltage up and down, prolonged operation using hermetic seal with He gas, prolonged operation using Ir contacts, ability to charge all capacitors simultaneously or based on charge transfer, only simple vibrations necessary to drive the circuits, need for two power supplies for some converters. In the art, large surface area, low tolerance valued capacitors, such as topological capacitors, are integrated to realize these MEMS switching converters.

A prior art switching circuit configuration is illustrated with reference to FIG. 1. FIG. 1(a) illustrates a parallel-series converter as is known in the art. In this embodiment, the input and the output voltages are 1.5V and 12V, respectively. FIG. 1(b) illustrates a charge transfer converter as is known in the art which also has an input voltage of 1.5V and an output voltage of 12V. With reference to FIG. 2, in these embodiments, the required capacitor value for the charge transfer converter, operating frequency 1 kHz at 10% ripple, will be 1.5 nF to realize 12V from a 1.5V supply. In these prior art embodiments, solid-state switches are employed, such as transistors or diodes.

Accordingly, what is needed in the art is an efficient DC to DC high voltage converter that requires only simple vibrations to drive the circuits.

SUMMARY OF INVENTION

A DC to DC high voltage converter in accordance with the present invention has three parts; an oscillator driver, main switch array or voltage multiplier, and an array of topological capacitors.

A microelectromechanical (MEMS) DC high voltage converter in accordance with the present invention, includes an oscillator driver that provides an actuating vibration, and a voltage multiplier further comprising a plurality of MEMS switches, each of the plurality of MEMS switches activated by the vibration of the oscillator driver and a plurality of charge storage capacitors coupled to the plurality of MEMS switches to provide a high voltage output from an input voltage received at the oscillator driver.

In a particular embodiment, the oscillator driver of the present invention includes at least one MEMS cantilever having a charging contact and a discharging contact, the charging contact and the discharging contact are coupled to an input voltage source supplying the input voltage.

In a specific embodiment, the MEMS cantilevers are fabricated using a metal cantilever beam supported by a dielectric cantilever beam. The dielectric cantilever beam is first positioned on a platinum pad formed on a silicon substrate.

The oscillator driver in accordance with the present invention may also actuate the main switch utilizing a resistor coupled in series between the cantilever and the input voltage source to generate the actuating vibration or a MEMS symmetric torsion device to generate the actuating vibration.

The main switch, or voltage multiplier of the present invention, further includes a plurality of MEMS cantilever switches coupled to receive the actuating vibration from the oscillator driver and a plurality of topological capacitors to store the charge generated by the switching motion of the cantilevers.

The converter in accordance with the present invention will be used as a high voltage supply from an environmentally available low voltage source. The device performs similarly to a wall transformer, but supplies high voltage DC using a low voltage DC source without any transistors or diodes, just mechanical switches only. Accordingly, the device can be used as a remote-sensing power supply without any p-n junction or magnetic elements required. The conversion efficiency is very high. The device can be employed whenever electrical power is required and the device will supply electricity from an environmental cell at low voltage.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

A DC to DC high voltage converter in accordance with the present invention consists of three fundamental elements, including an oscillator driver, a main switch array and an array of capacitors. The capacitors are used for charge storages for high voltage generation.

Figure 1:
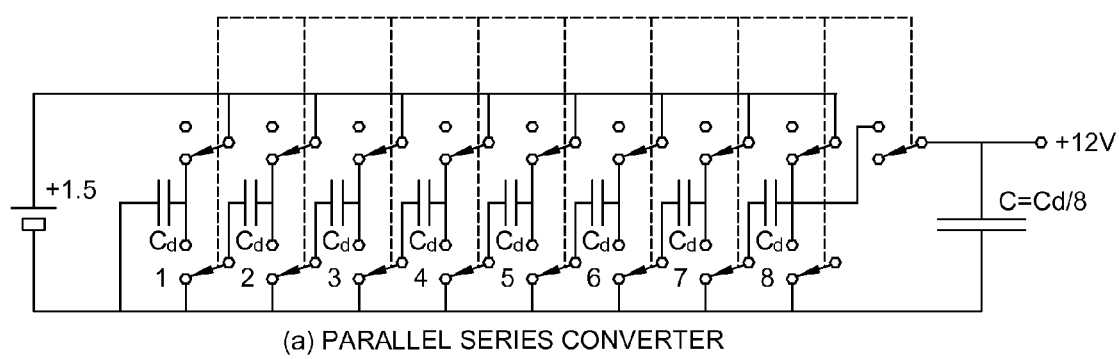
FIG. 1 is a diagrammatic view (a) a parallel series converter and (b) a charge transfer converter which are currently known in the art.
Figure 1:
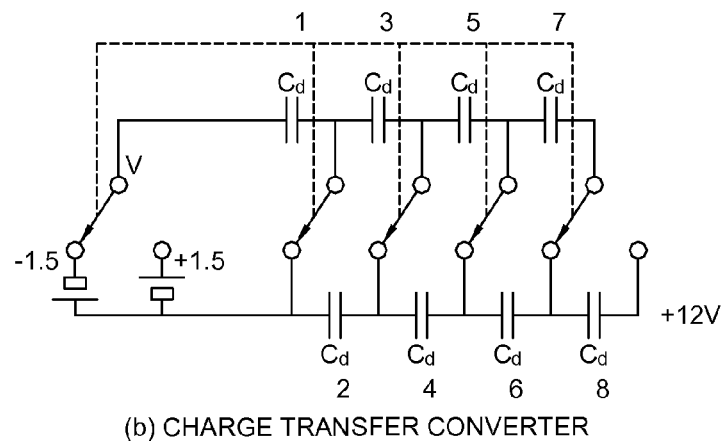
Figure 2:
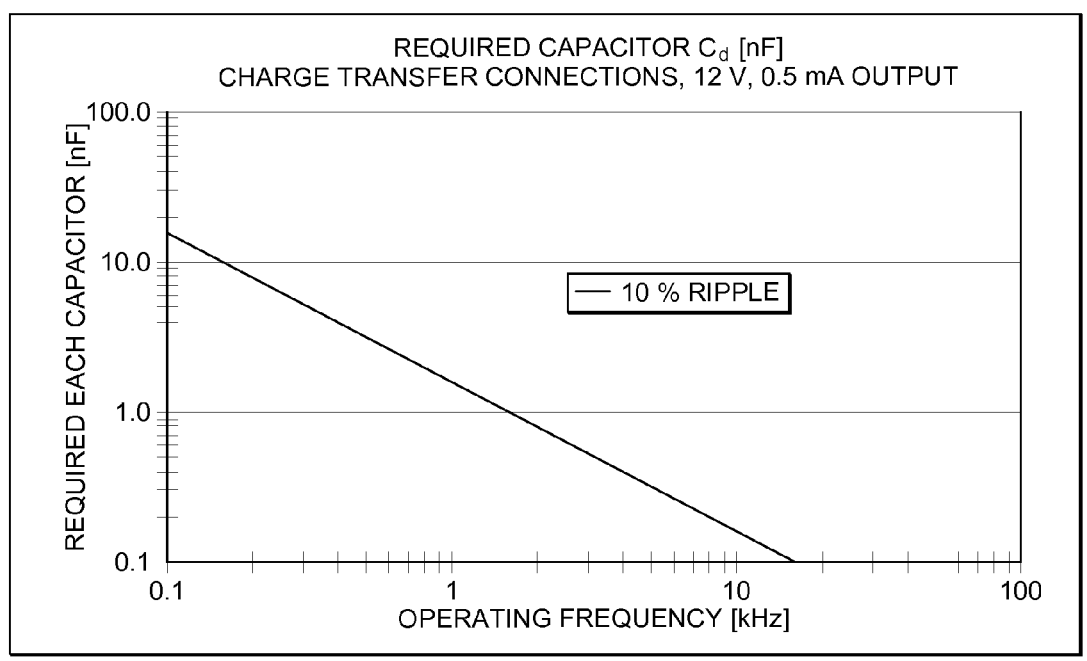
FIG. 2 is a graphical illustration of the Required Capacitor vs. Operating Switching Frequency for a switching circuit as is known in the art.
Figure 3:
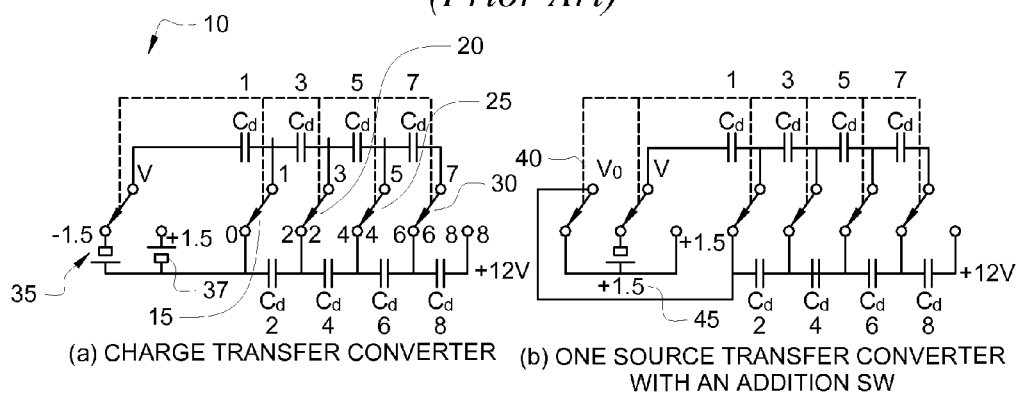
FIG. 3 is a diagrammatic view of a charge transfer circuit employing switches in which is currently known in the art.

With reference to FIG. 3(a), a high voltage converter circuit 10 as is known in the art is illustrated wherein the switches 15, 20, 25 and 30 of the main switch array operate as a Cockcroft-Walton circuit. A Cockcroft-Walton (CW) circuit is basically a voltage multiplier that converts AC or pulsing DC electrical power from a low voltage level to a higher DC voltage level. A Cockcroft-Walton circuit known in the art is comprised of a voltage multiplier ladder network of capacitors and diodes. Using only these capacitors and diodes a Cockcroft-Walton circuit can step-up relatively low voltages to extremely high values, while eliminating the need for heavy core transformers. In this embodiment, the main switch consists of 5-circuits 2 poles. In such a circuit, the voltage across each stage of the cascade is equal to twice the peak input voltage 35 or 37, as such, the circuit requires relatively low cost components and is easy to insulate. FIG. 3(b) illustrates a similar circuit to that of FIG. 3(a), wherein an additional switch 40 is provided to allow the use of a single source input voltage 45.

In accordance with an embodiment of the present invention, a DC to DC high voltage converter circuit is implemented by replacing the diodes of the Cockcroft-Walton circuit with MEMS switches. Topological capacitors are then integrated for charge storages for high voltage generation.

Figure 4:
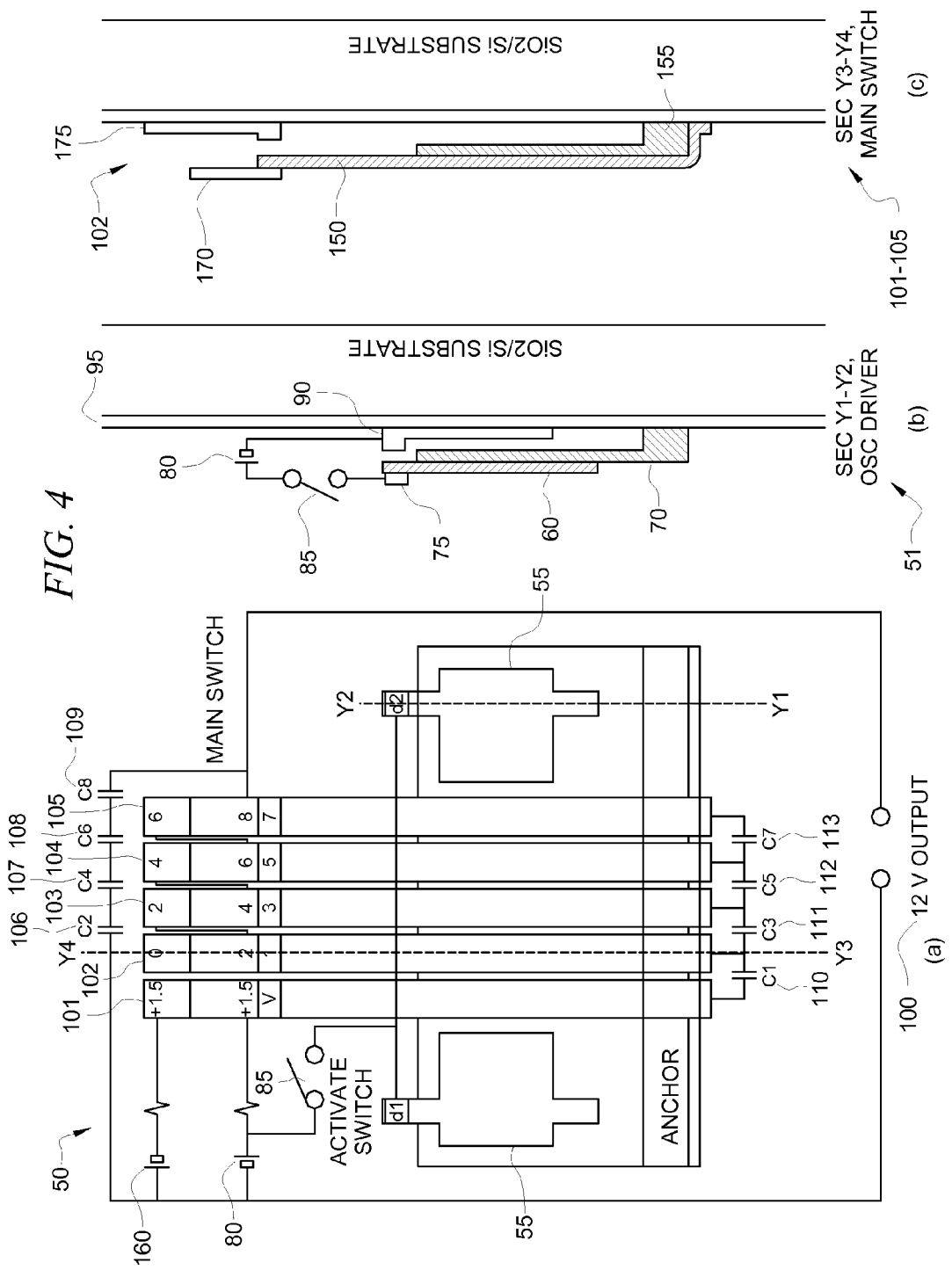
FIG. 4 is a diagrammatic view of (a) a DC to DC transformer, (b) a cross-sectional view of the oscillator driver cantilever of the DC to DC transformer, and (c) a cross-sectional view of a main switch cantilever in the voltage multiplier circuit in accordance with the present invention.

With reference to FIG. 4(a), an embodiment of the DC to DC transformer 50 in accordance with the present invention is illustrated. The transformer 50 includes a self-oscillation driver having a large area of platinum (Pt) coating 55, the large conductor thereby forming a capacitive element. The MEMS cantilever switch 60, is then positioned on top of the Pt coating 55. To balance the motion of the microelectromechanical circuit, two oscillation drivers on each side are activated. In a particular embodiment the drivers are located at both sides of the main switch array. Utilizing two drivers provides stable switching motion of the cantilevers 60, 65.

To more clearly illustrate the oscillator driver of the present invention, a cross-section (Y1-Y2) of the oscillator driver circuit 51 is shown with reference to FIG. 4(b). As shown in FIG. 4(b) a metal cantilever 60 is supported by a dielectric cantilever 70. The cantilever 60 is normally "on" with the upper metal contact 75. A normally "on" contact supplies 1.5V from a 1.5V supply 80 via a demand activated switch 85.

When the demand activated switch 85 is turned on, the upper metal contact 75 charges the cantilever electrode 60 through the power source 80. The charged cantilever electrode 60 is then is attracted by the bottom electrode 90 on the substrate 95 until the cantilever touches the bottom electrode 90. When the cantilever 60 contacts the bottom electrode 90, the charge on the cantilever 60 is discharged and the cantilever springs back and contacts the upper electrode 75 and begins recharging though the power source 80. This motion of the cantilever 60 repeats continuously and activates the main switches 101, 102, 103, 104, 105 of the circuit until the activate switch 85 is turned off. When the activate switch 85 is turned off, the circuit consumes no power. The oscillator driver 51 is integrated with the main switches 101-105 of the transformer and the topological capacitors 106-113 to generate a high voltage 100 from the 1.5V supply 80.

Figure 5:
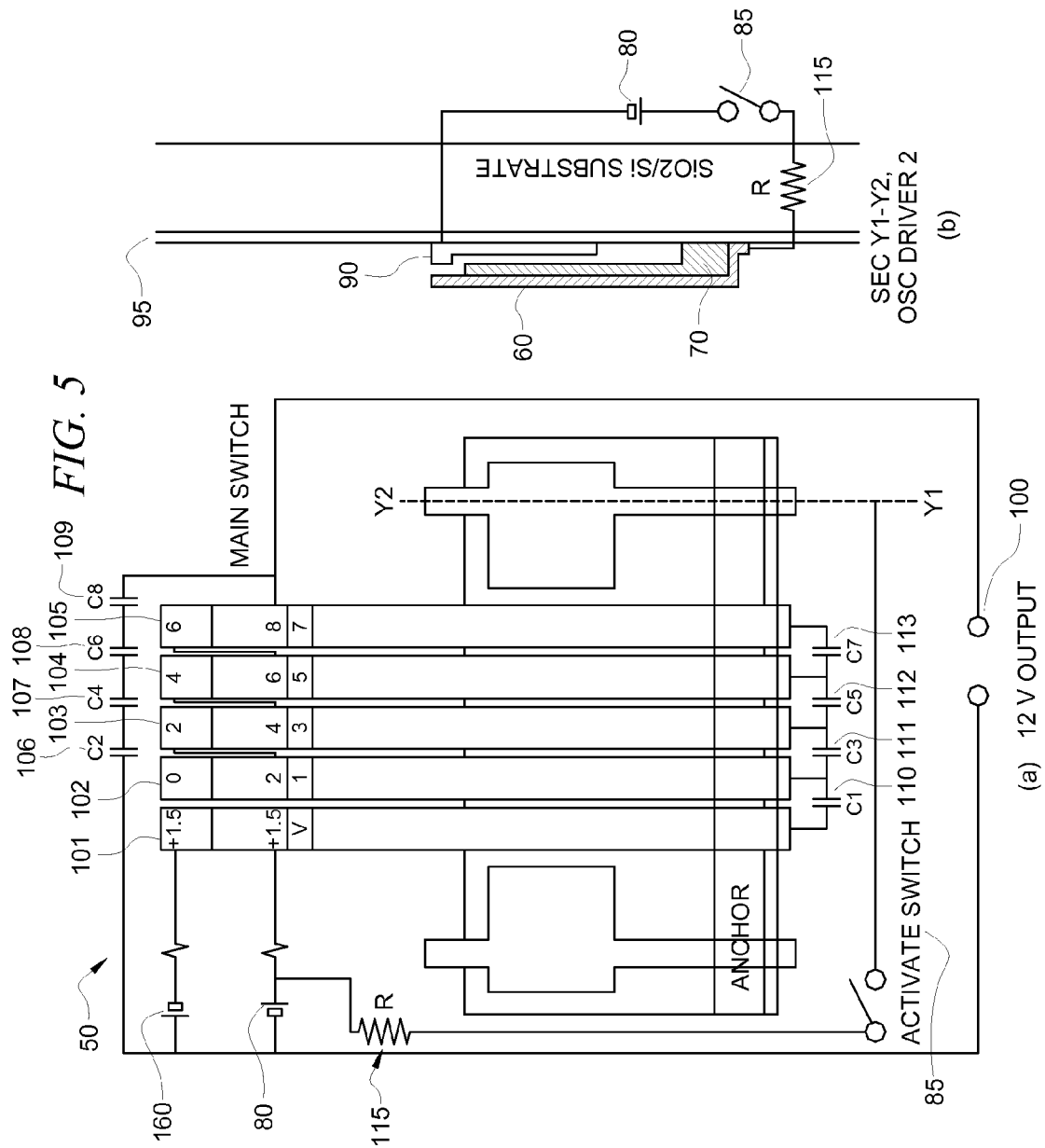
FIG. 5 is a diagrammatic view of an additional embodiment of the DC to DC transformer in accordance with the present invention employing an alternate oscillator driver.

In an additional embodiment of the oscillator driver 51, the charging contact 75 and the discharging contact 90 can be replaced by a series resistor 115 as shown with reference to FIG. 5. In this embodiment, the series resistor 115 is used to slowly charge the voltage on cantilever 60 until the pull-in voltage is achieved and the cantilever 60 snaps down and contacts the bottom electrode 90, making an electrical connection. Upon reaching this closed position, the cantilever 60 charges from the supply 80 and the voltage on the cantilever 60 is reduced to the voltage at the bottom electrode 90, at which point the electrostatic forces become zero and the cantilever 60 rebounds away from the switched-on position. The series resistor 115 continues to re-charge the cantilever 60 voltage toward pull-in and the process continues indefinitely or until the demand-activated switch 85 is turned off.

Figure 6:
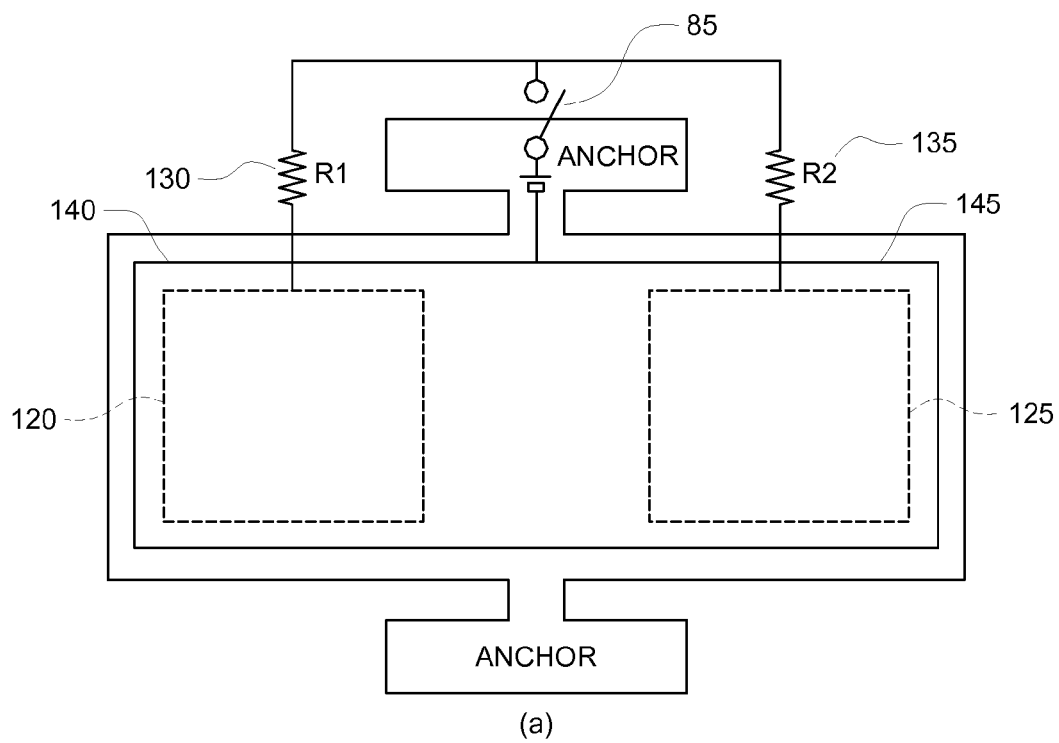
FIG. 6 is a diagrammatic view of an additional embodiment of the DC to DC transformer in accordance with the present invention employing a torsion oscillator driver.
Figure 6:
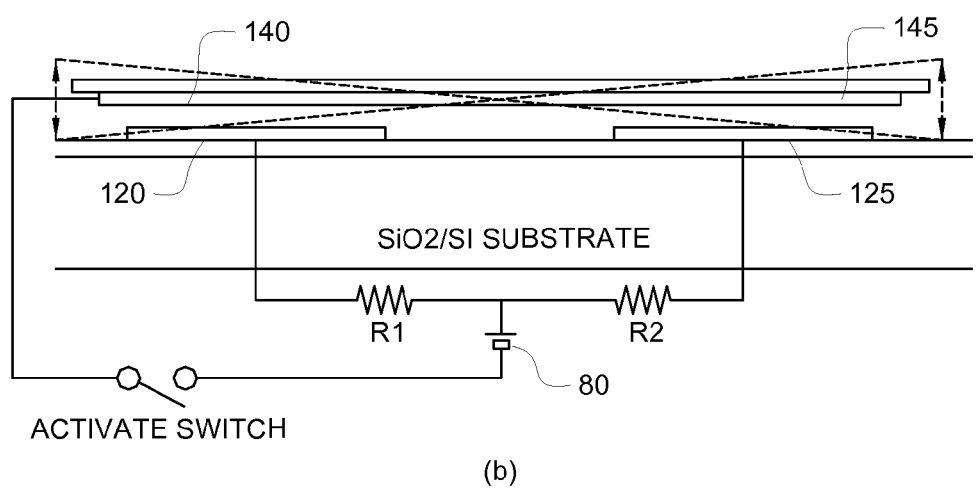

In yet another embodiment of the oscillator driver 51 in accordance with the present invention, a self-oscillating electromechanical configuration can be envisioned wherein a symmetric torsion device is used in place of a cantilever as shown in FIG. 6. In this embodiment, a ground potential is connected to the torsion device having a first end 140 and second end 145, and two pull-in pads 120, 125 are connected to the power source 80 through independent series resistors 130, 135 and a demand-activated switch 85. Upon closure of the demand-activated switch 85, the torsion second end 145 of the torsion device pulls toward the pull-in pad 125, eventually making an electrical connection. Upon making an electrical connection, the contacted pull-in pad 125 is discharged, reducing the electrostatic forces on that half of the torsion device 145 to zero. Since the alternate pull-in pad 120 is charged to a higher voltage potential, the first end 140 torsion device then tilts toward and eventually connects to that pad 120, at which point the pad 120 is discharged. Choosing appropriate values of the resistors 130, 135 and the device capacitance, and mechanical resonance, the oscillator driver utilizing a symmetric torsion device can continue to oscillate between the two switching sides 140, 145 of the torsion device indefinitely or until the demand-activated switch 85 is turned off. The torsion layout may be advantageous in that switching contacts are on all the same surface, which may simplify physical realization of the switch.

The DC to DC transformer 50 in accordance with the present invention includes a voltage multiplier which comprises a plurality of MEMS switches. Each of the plurality of MEMS switches are activated by the vibration of the oscillator driver and a plurality of charge storage capacitors are coupled to the plurality of MEMS switches to provide a high voltage output from an input voltage received at the oscillator driver.

With reference again to FIG. 4, in a particular embodiment of the present invention the voltage multiplier operates in similar fashion to a Cockcroft-Walton circuit. In this embodiment, a plurality of MEMS cantilevers 101, 102, 103, 104, 105 are integrated with the plurality of topological capacitors 106-113 which are used for charge storages for high voltage generation.

In the embodiment illustrated in FIG. 4(a) the main switch, or voltage multiplier, of the present invention consists of 5-circuits 2-poles. In the cross-sectional view of cantilever 102 of the main switch, (Y3-Y4) shown in FIG. 4(c) the moving metal cantilever 150 is supported by a more solid dielectric cantilever 155. This structure ensures that all five contacts of the five cantilevers will be on or off consistently.

The voltage multiplier main switch consists of two low voltage sources 80, 160 and 5-circuit 2-pole cantilever switches 101-105. Each cantilever switch has one extended Pt moving finger terminal 150 between the normally on upper contact 170 and the normally off bottom contact 175. The switches are connected as shown in the charge transfer converter in FIG. 3(a). In an additional embodiment, the circuit configuration may be modified to have 6-circuits, 2-poles switches and one low voltage source as shown in FIG. 3(b). The oscillator driver previously described generates vibration for activating the main switches of the voltage multiplier using an electrostatic force rather than magnetic force. Each switching motion of the main switches 101-105 causes the charge of each capacitor 106-113 to be transferred to the right side of the capacitors 106-113. The charge transfers left to right through each of capacitors 106-109 thereby reaching a full voltage of 3V within a few cycles. Thus, the output terminal voltage 100 reaches 12V. The array of main switches transfer charges and generates a high voltage output.

Figure 7:
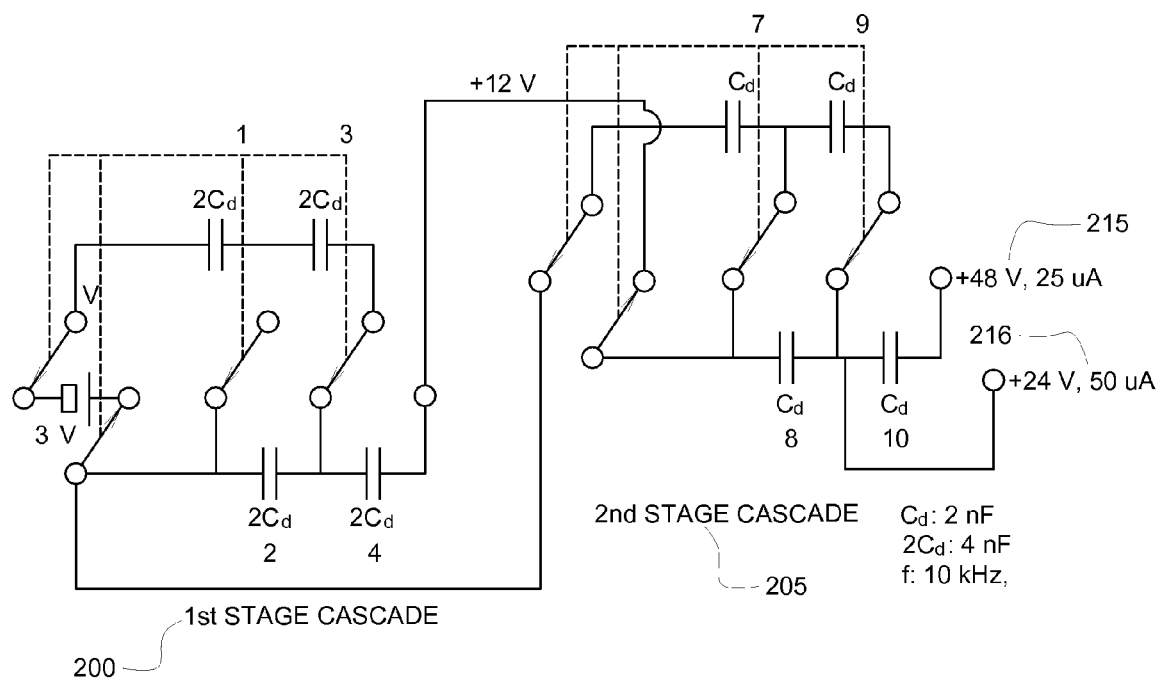
FIG. 7 is a diagrammatic view of an additional embodiment of the DC to DC transformer in accordance with the present invention illustrating the use of cascading main switches.

In an additional embodiment, a charge transfer converter in accordance with the present invention having a plurality of cascading stages is illustrated with reference to FIG. 7. In FIG. 7 it can be seen that a higher voltage level 215 or 216 can be attained by cascading a 1$^{st}$ stage main switch 200 and a 2nd main switch 205.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of providing a high voltage output from a low voltage input, the method comprising the steps of:

providing a low voltage input to an oscillator driver to generate an actuating vibration;

providing the actuating vibration to an input of a voltage multiplier; and activating a plurality of MEMS switches of the voltage multiplier to store charges from the low voltage source onto a plurality of charge storage capacitors coupled to the plurality of MEMS switches to generate a high voltage output.

2. The method of claim 1, wherein the oscillator driver generates an actuating vibration utilizing at least one MEMS cantilever having a charging contact and a discharging contact, the charging contact and the discharging contact coupled to an input voltage source.

3. The method of claim 1, wherein the oscillator driver generates an actuating vibration utilizing at least one MEMS cantilever and a resistor positioned in series between the low voltage source and a charging contact of the MEMS cantilever, the resistor to slowly charge the voltage on the cantilever to a pull-in voltage upon application of the low voltage source.

4. The method of claim 1, wherein the oscillator driver generates an actuating vibration utilizing a symmetric torsion device.

5. The method of claim 1, wherein each of the plurality of switches of the voltage multiplier further comprises a MEMS cantilever coupled to receive the actuating vibration from the oscillator driver.

6. The method of claim 1, wherein the charge storage capacitors are topological capacitors.

* * * * *

UNITED STATES PATENT AND TRADEMARK OFFICE
CERTIFICATE OF CORRECTION

| | | |
|---|---|---|
| PATENT NO. | : 8,088,638 B1 | Page 1 of 1 |
| APPLICATION NO. | : 11/687223 | |
| DATED | : January 3, 2012 | |
| INVENTOR(S) | : Langebrake et al. | |

It is certified that error appears in the above-identified patent and that said Letters Patent is hereby corrected as shown below:

On the title page item (75), should read:

(75) Lawrence Langebrake, Seminole, FL

Signed and Sealed this
Fourteenth Day of February, 2012

David J. Kappos
*Director of the United States Patent and Trademark Office*